United States Patent
Nandanuru et al.

(10) Patent No.: US 10,901,597 B1
(45) Date of Patent: Jan. 26, 2021

(54) ATM SCREEN PERSONALIZATION

(71) Applicant: Wells Fargo Bank, N.A., San Francisco, CA (US)

(72) Inventors: Prasanth Nandanuru, Seriligampally (IN); Dennis E. Montenegro, Concord, CA (US); Shiju Thukalankuzhy John, Hyderabad (IN); Yevanna Yejjala, East Godavari Dist. (IN); Chinababu Kona, West Godavari (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 16/390,854

(22) Filed: Apr. 22, 2019

Related U.S. Application Data (63) Continuation of application No. 14/984,540, filed on Dec. 30, 2015, now abandoned.

(51) Int. Cl.
*G06F 3/0484* (2013.01)
*G06Q 20/10* (2012.01)

(52) U.S. Cl.
CPC ..... *G06F 3/04847* (2013.01); *G06Q 20/1085* (2013.01)

(58) Field of Classification Search
CPC ............ G06F 3/04847; G06Q 20/1085
See application file for complete search history.

(56) References Cited

U.S. PATENT DOCUMENTS

| | | | |
|---|---|---|---|
| 7,328,839 B2 | 2/2008 | Keohane et al. | |
| 7,494,050 B1 | 2/2009 | Bowen et al. | |
| 7,747,527 B1 | 6/2010 | Korala | |
| 7,753,259 B1 | 7/2010 | Taylor et al. | |
| 7,822,684 B2 | 10/2010 | Rielly et al. | |
| 8,087,001 B2 | 12/2011 | Hoyek et al. | |
| 8,281,985 B1 | 10/2012 | Steinmetz et al. | |
| 8,408,455 B1 | 4/2013 | Taylor et al. | |
| 9,311,632 B1 | 4/2016 | Dent | |
| 10,373,148 B1 * | 8/2019 | Dixon | G06Q 20/3224 |
| 2002/0035541 A1 | 3/2002 | Makino et al. | |
| 2002/0099658 A1 | 7/2002 | Nielsen et al. | |
| 2003/0066876 A1 | 4/2003 | Goldman et al. | |
| 2006/0038004 A1 | 2/2006 | Rielly et al. | |
| 2006/0089908 A1 | 4/2006 | Keohane | |
| 2010/0332388 A1 | 12/2010 | Rielly et al. | |
| 2011/0184865 A1 | 7/2011 | Mon et al. | |

(Continued)

OTHER PUBLICATIONS

"U.S. Appl. No. 14/984,540, Final Office Action dated Jan. 4, 2019", 13 pgs.

(Continued)

*Primary Examiner* — Shourjo Dasgupta (74) *Attorney, Agent, or Firm* — Schwegman Lundberg & Woessner, P.A.

(57) ABSTRACT

Various systems and methods for providing ATM screen personalization are described herein. A system includes a display; a processor subsystem; and a memory including instructions, which when executed by the processor subsystem, cause the processor subsystem to: receiving, at an ATM, an ATM configuration setting from a non-ATM channel, the ATM configuration setting set by a user of the ATM; and displaying a user interface on the display, the user interface configured with the ATM configuration setting.

20 Claims, 9 Drawing Sheets

(56) References Cited

U.S. PATENT DOCUMENTS

| | | |
|---|---|---|
| 2012/0197797 A1 | 8/2012 | Grigg et al. |
| 2012/0197798 A1 | 8/2012 | Grigg et al. |
| 2012/0278234 A1 | 11/2012 | Dent et al. |
| 2013/0085940 A1* | 4/2013 | O'Laughlin .......... G06Q 20/042 705/44 |
| 2013/0110717 A1 | 5/2013 | Kobres |
| 2013/0124411 A1 | 5/2013 | Kobres et al. |
| 2013/0185148 A1 | 7/2013 | Townsend |
| 2013/0238497 A1 | 9/2013 | Ramachandran et al. |
| 2014/0019336 A1* | 1/2014 | Browne .................. G06Q 40/02 705/39 |
| 2014/0046842 A1* | 2/2014 | Irudayam ............ G06Q 20/3223 705/43 |
| 2014/0058943 A1 | 2/2014 | Glencross |
| 2014/0172703 A1 | 6/2014 | Black |
| 2015/0001289 A1 | 1/2015 | Smith et al. |
| 2015/0090782 A1* | 4/2015 | Dent .................... G06O 20/042 235/379 |
| 2016/0019510 A1 | 1/2016 | Guntupalli |
| 2016/0092863 A1 | 3/2016 | Chintakayala |
| 2016/0098692 A1 | 4/2016 | Johnson et al. |
| 2016/0098700 A1 | 4/2016 | Johnson et al. |
| 2016/0098709 A1 | 4/2016 | Johnson et al. |
| 2016/0162855 A1 | 6/2016 | Johnson et al. |
| 2016/0162856 A1 | 6/2016 | Johnson |
| 2016/0267438 A1 | 9/2016 | Sobol et al. |
| 2016/0321627 A1 | 11/2016 | Mccracken et al. |

OTHER PUBLICATIONS

"U.S. Appl. No. 14/984,540, Non Final Office Action dated Jun. 11, 2018", 14 pgs.

"U.S. Appl. No. 14/984,540, Notice of Allowance dated Jan. 23, 2019".

"U.S. Appl. No. 14/984,540, Response filed Jan. 11, 2018 to Final Office Action dated Jan. 4, 2019", 8 pgs.

"U.S. Appl. No. 14/984,540, Response filed Sep. 11, 2018 to Non Final Office Action dated Jun. 11, 2018", 9 pgs.

"Implementing EMV at the ATM: Requirements and Recommendations for the U.S. ATM Community", EMV Migration Forum Version 2.0, (Jun. 2015), 95 pgs.

"Intelligent Deposit ATMs", [Online]. [Accessed Dec. 29, 2018]. Retrieved from the Internet: <URL: https://www.qsibanking.com/index.php/products-menu/atms/intelligent-deposit >, 2 pgs.

"Wells Fargo Experimenting With 'Pre-Staging' of Transactions", [Online]. [Accessed Jun. 1, 2018]. Retrieved from the Internet: <URL: http://www.cutoday.info/Fresh-Today/Wells-Fargo-Experimenting-With-Pre-Staging-Of-Transactions >, (2018), 1 pg.

Weisbaum, Herb, "Banks putting human tellers in ATMs", [Online]. [Accessed Dec. 29, 2018]. Retrieved from the Internet: <URL: https://www.nbcnews.com/tech no logy /ban ks-putting-hu man-tellers-atms-6C 1 O 791363 >, (Aug. 4, 2013), 7 pgs.

U.S. Appl. No. 14/984,540, filed Dec. 30, 2015, ATM Screen Personalization.

\* cited by examiner

ATM SCREEN PERSONALIZATION

CROSS-REFERENCE TO RELATED APPLICATION

This application is a continuation of U.S. patent application Ser. No. 14/984,540, filed Dec. 30, 2015, which is incorporated by reference herein in its entirety.

TECHNICAL FIELD

Embodiments described herein generally relate to client device configuration and in particular, to automated teller machine screen personalization.

BACKGROUND

An automated teller machine (ATM) is an electronic device that enables customers to perform transactions in the absence of human bank tellers, cashiers, or clerks. Activities, such as a cash withdrawal, that are typically performed in a banking branch at a teller station may be performed nearly anywhere in the world where an ATM is able to communicate with a banking branch. Customers may perform a wide variety of transactions at an ATM, including cash withdrawals, deposits, balance reports, print statements, or even purchasing postage stamps.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

Systems and methods described herein provide ways to personalize an ATM screen. ATM screens have evolved from the early days where the user interface was primarily monochrome text with a small number of physical buttons to current systems that implement touchscreen displays in high-resolution. Although the input mechanisms and presentation mechanisms may have changed, in many cases, the functionality of the user interface has not kept pace. Early systems provided linear workflows with simplistic options. What is needed is a system that provides more customization, personalization, and functionality for automated teller machines, automated banking machines, cash machines, and other similar devices.

Figure 1:
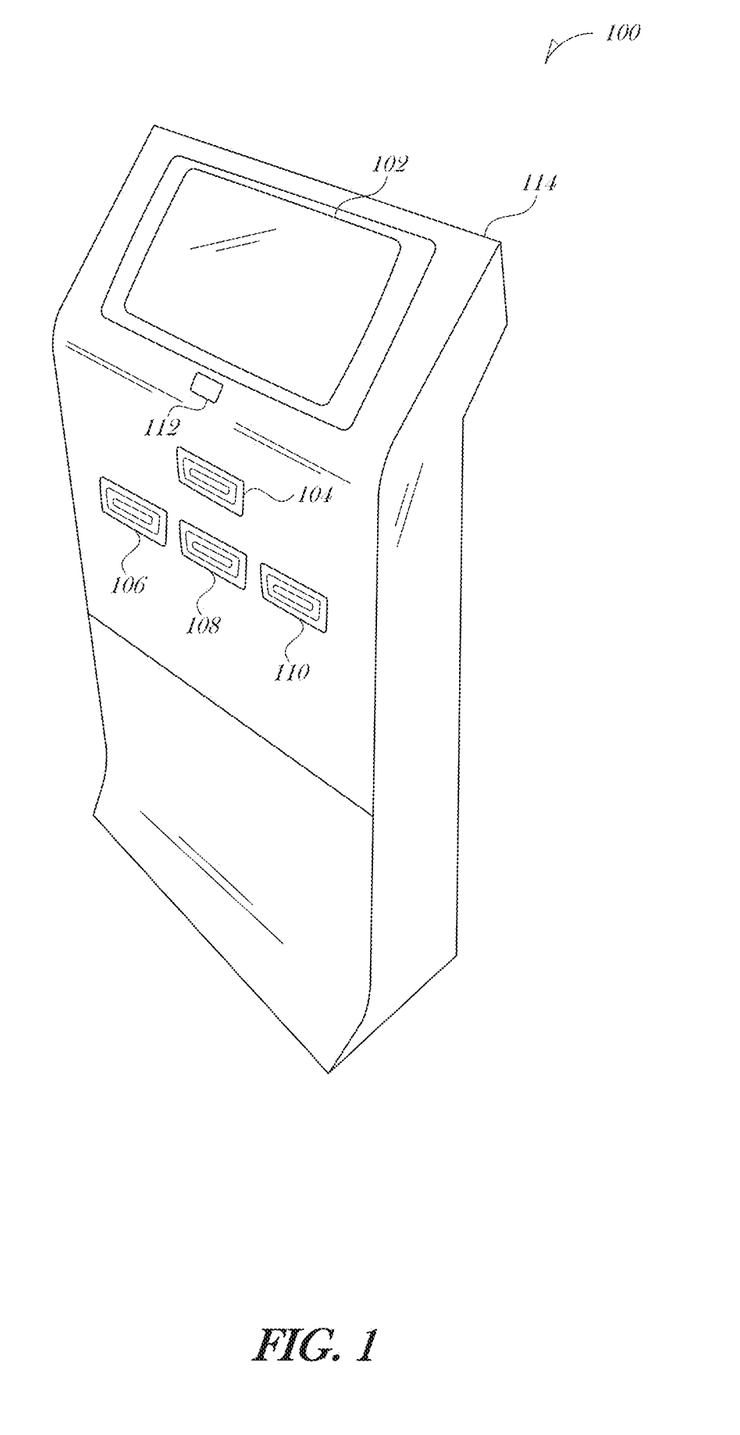
FIG. 1 is a diagram illustrating an automated teller machine (ATM), according to an embodiment.

FIG. 1 is a diagram illustrating an automated teller machine (ATM) 100, according to an embodiment. The ATM 100 includes a touchscreen 102, a card reader 104, a bill dispenser 106, a receipt printer 108, a bill acceptor 110, and a scanning device 112, all housed in a cabinet 114. The card reader 104 may support various card types, including but not limited to Magcard, integrated circuit (IC) cards, radio frequency (RF) cards, MIFARE® cards, and the like. The card reader 104 may use magnetic signals, optoelectronic signals, or rear card signals to receive card data from a card. Bank cards, credit cards, drivers' licenses, and other types of cards may be deposited in the card reader 104 for a customer to access a financial account.

The bill dispenser 106 may operate to dispense currency, banknotes, or other items, such as sheets of stamps. The receipt printer 108 may be a thermal printer able to output statements, transaction receipts, error reports, and the like. The bill acceptor 110 may be a four-way insertion acceptor, able to receive and scan banknotes, checks, deposit slips, or the like. The scanning device 112 may be a bar code scanner, RFID card reader, passport reader, biometric reader (e.g., fingerprint scanner), IC card reader, or the like.

The touchscreen 102 may be a single-point or multi-point touchscreen able to receive touch input from a customer at the ATM 100. The touchscreen 102 may be polarized or have a polarized filter disposed on it to provide security by limiting the viewable angles. The touchscreen 102 may have portions that are touch-enabled and other portions that are not touch-enabled, only for display.

In addition, the ATM 100 may have other input and output devices, such as a microphone, camera, speakers, USB port, wired or wireless networking radios, coin acceptors, physical keypad, backup power supplies, and the like.

To use the ATM 100, a customer may approach it and present a bankcard. The customer may insert the bankcard into the card reader 104 or present it to an IC reader 112. The touchscreen 102 may update the display to present a personal identification (PIN) pad. The customer may then provide a PIN using the touchscreen 102. Upon authenticating the customer, the touchscreen 102 may then present one or more options for the customer. The options may include various types of financial transactions, such as depositing or withdrawing funds from a financial account.

While some examples or discussion may refer to a customer, it is understood that the term user and customer may be interchangeable when a user who uses an ATM is also a customer of the financial institution for the accounts accessed via the ATM. Additionally a user may be a person who has an add-on card or a subsidiary account (e.g., a child), and may not technically be the customer of the financial institution. Thus, the references to user and customer may be considered interchangeable based on the context of the discussion.

Figure 2:
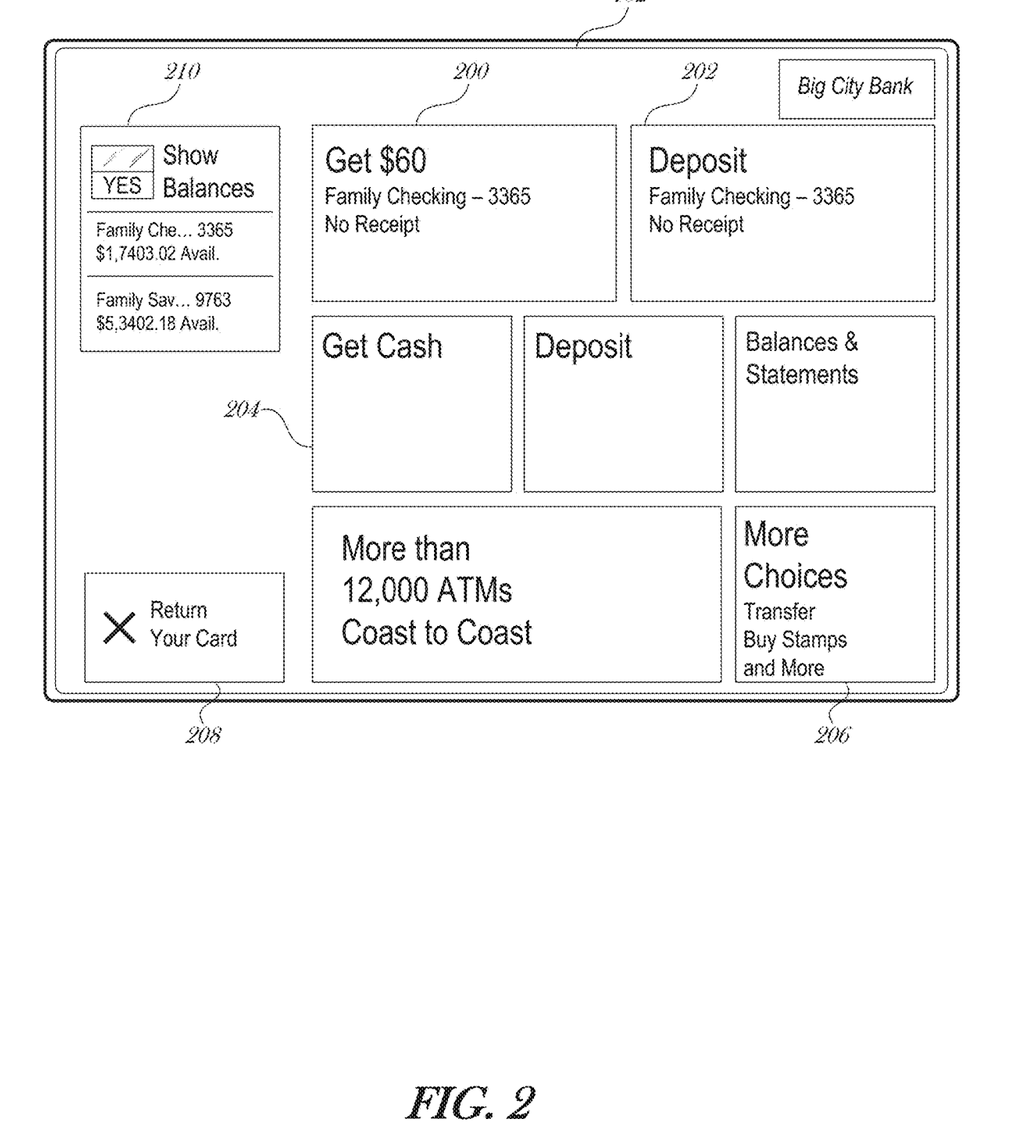
FIG. 2 is an example user interface, according to an embodiment.

FIG. 2 is an example user interface, according to an embodiment. The customer may perform quick transactions, such as withdrawing $60 (control 200) or depositing into a checking account (control 202). The quick transactions (controls 200 and 202) may be dynamically assigned based on a history of transactions made by the customer. For example, if the customer typically withdraws money in $60 amounts, the quick transaction (control 200) may be dynamically configured to provide a one-touch transaction mechanism for the customer. If the customer chooses to withdraw some other amount, the customer may activate the Get Cash control 204 or the More Choices control 206. When the customer is finished, the customer may activate the Return Your Card control 208 to terminate the session and return the customers bankcard.

Each of the controls (e.g., 200, 202, or 206) may be dynamically configured to present information based on the customer's preferences, transaction history, or other information. For example, if the customer does not a savings account, then the customer would not be presented an option to deposit funds to a savings account in control 202 or display savings account balances in the Show Balances control 210.

While some transaction types and options are illustrated in FIG. 2, it is understood that more or fewer options may be presented. Additionally, it is understood that other forms of user interface design may be used without departing from the scope of the disclosure. For example, multi-touch controls to "swipe" from one screen to another, scroll the options, or perform other functions are within the scope of the disclosure.

While the user interface illustrated in FIG. 2 is customized and personalized to an extent, in some cases the list of options displayed on the ATM touchscreen 102 is confusing. In order to provide additional functionality and flexibility for the customer, the ATM touchscreen 102 may be personalized based on the customer's own configuration preferences.

Figure 3:
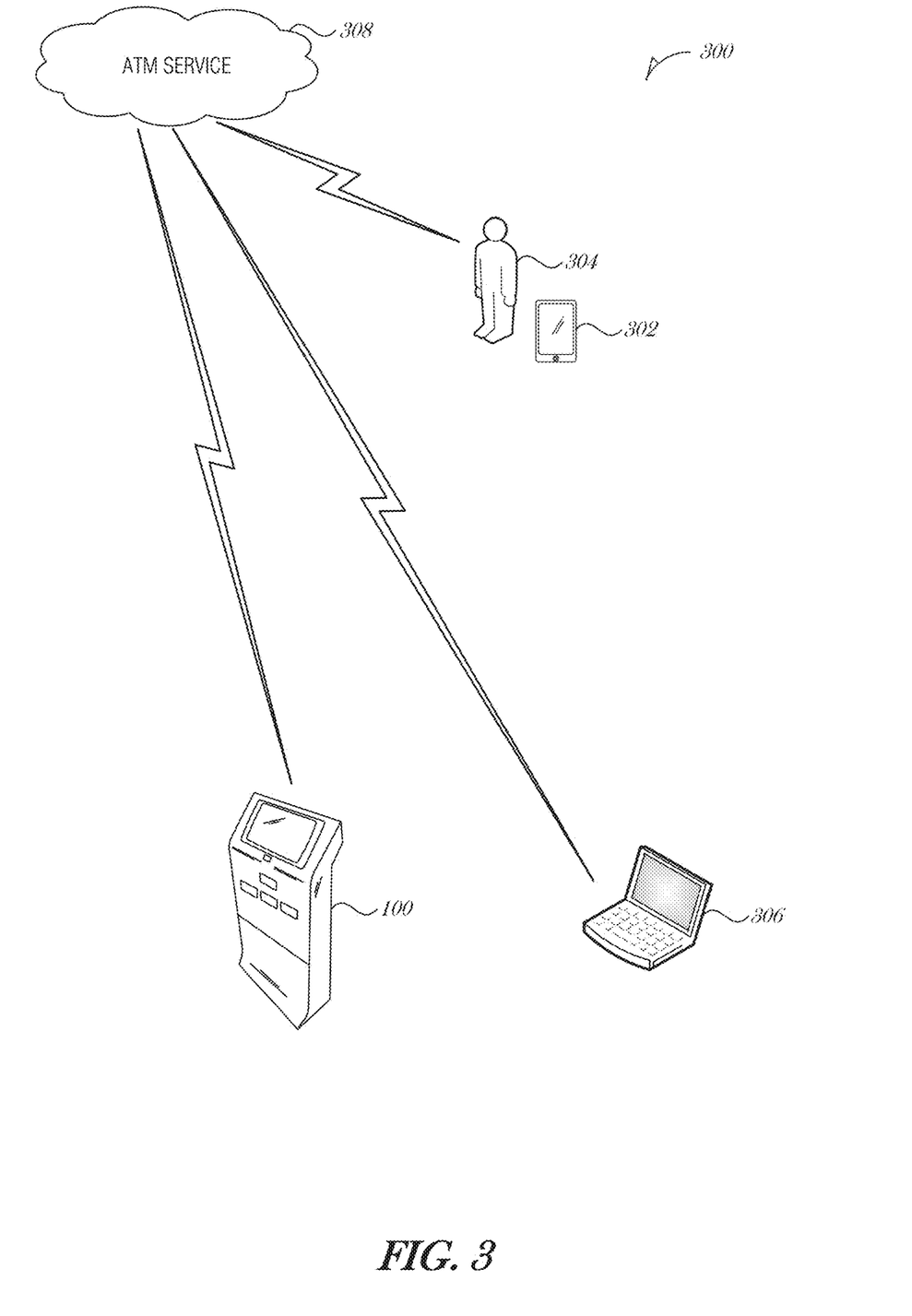
FIG. 3 is a diagram illustrating an ATM communication system, according to an embodiment.

FIG. 3 is a diagram illustrating an ATM communication system 300, according to an embodiment. The ATM communication system 300 provides for communication among an ATM 100 and one or more client devices. In the example illustrated in FIG. 3, client devices include a mobile device 302 of a user 304, and a laptop device 306. Other client devices are included in the scope of this discussion including, but not limited to kiosks, in-vehicle infotainment systems, desktops, smartphones, tablets, and the like. The user 304 may use the mobile device 302 to set preferences to configure the user interface (UI) of the ATM 100. The user 304 may use the mobile device 302 while out and about or use the laptop device 306 while at home, for example. The mobile device 302 or the laptop device 306 may be connected to an ATM service 308, which may be hosted in a cloud service. The ATM service 308 may communicate with the ATM 100 and provide the UI settings for the ATM 100. Different settings may be used based on the ATM's location, type, or other characteristic of the ATM 100. In this way, the user 304 may personalize the UI with more granularity.

Using an application, web page, or other interface, the user 304 may set various layout preferences, quick transactions, or available transactions for the ATM 100. The layout preferences, quick transactions, or available transactions may be set specifically for one card (e.g., the master card), with different preferences and transactions set for a different card (e.g., an add-on card linked to the primary cardholder's account). In this way, a husband's ATM UI may be different from his wife's, even though both cards access the same accounts.

In addition, the preferences may be set according to specific channels. A channel in this document refers to a customer-oriented presentation platform. Examples of channels include, but are not limited to mobile banking, online banking, branch banking, in-store kiosks, airport kiosks, and the like. Layouts and options may differ based on the channel to provide the customer quicker access to transactions that are more common in a certain context, reduce or remove transactions to provide more security, or for other reasons. For example, the customer may configure the UI of ATMs that are located in airports to not display deposit transaction options. Such customization reduces clutter in the UI and also removes a transaction that is less likely to occur in an airport setting.

A non-ATM channel includes any platform that is not the ATM kiosk. Examples of non-ATM channels include a home computer, mobile phone, or an in-vehicle infotainment system. Embodiments described in this document provide an interface to a customer on a non-ATM channel that allows the customer to customize and personalize the ATM experience. The customer may perform any of three main types of customizations: 1) modify the ATM UI, 2) test transactional flow using an ATM simulator, and 3) create a pre-staged transaction.

Figure 4:
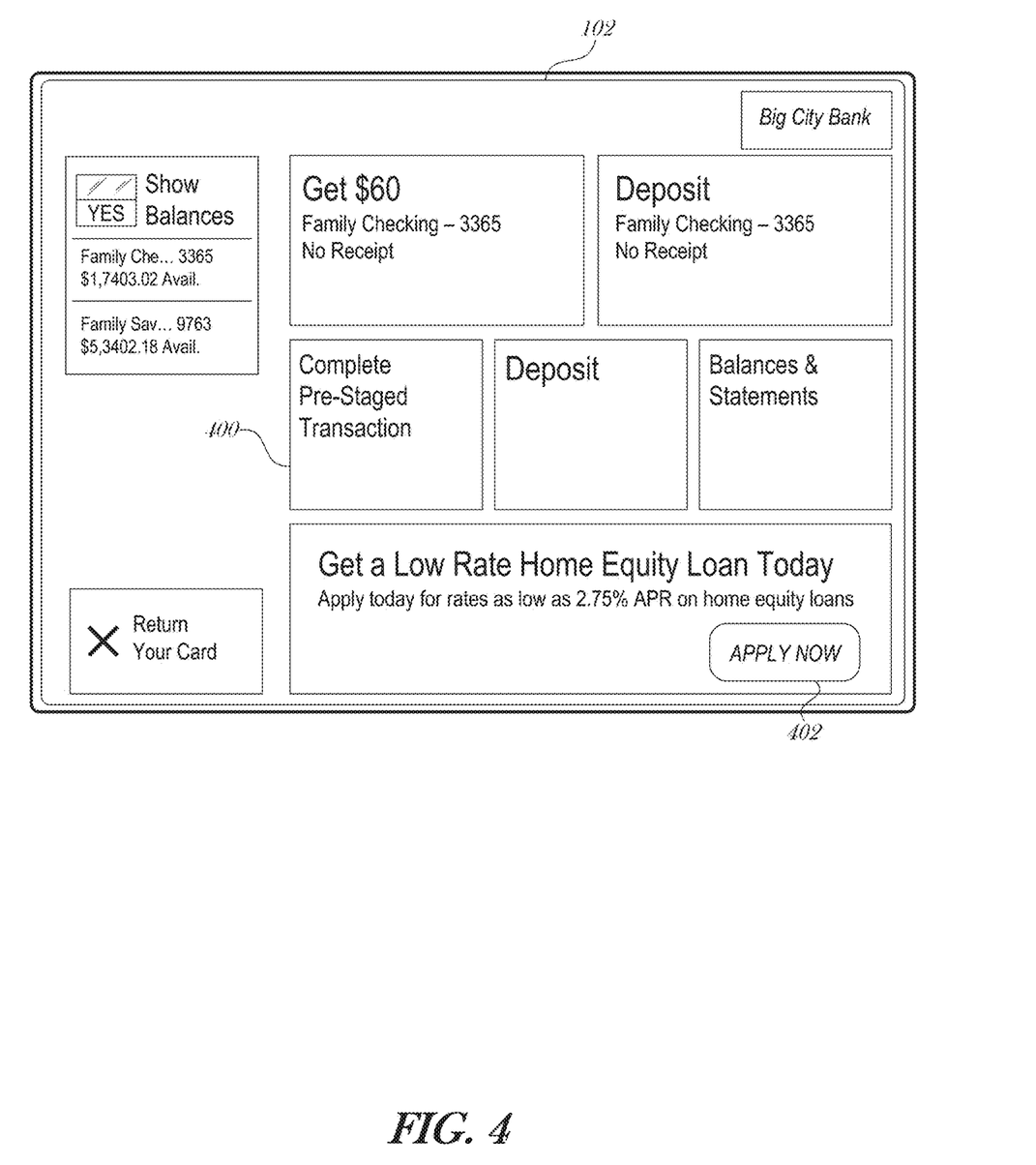
FIG. 4 is an example user interface based on a user's preferences, according to an embodiment.

To modify the ATM UI, the customer may reorganize menu options, set preferences for joint account holders, set advertising preferences, or generate customized buttons and icons via the interface. FIG. 4 is an example user interface based on a user's preferences, according to an embodiment. A pre-staged control 400 is presented that allows a user to complete a pre-staged transaction initiated on a non-ATM channel. The pre-staged transaction may be a deposit with the funds routing to several different accounts, for example. Other pre-staged transactions may be presented using the pre-staged control 400. The pre-staged control 400 may navigate the user to a secondary screen that lists the available pre-staged transactions available to complete. The user may then choose one (or more) and complete them at the ATM 100.

Another user interface modification of the UI presented on the touchscreen 102 is to show or hide controls based on context. In the example illustrated in FIG. 4, the control for More Choices, (e.g., control 206 from FIG. 2) is hidden in the UI presented in FIG. 4.

User preferences may also be used to control advertising preferences, such as what types of advertisements may be displayed on the UI, when the advertisements may be displayed, and where e.g., which channels). Other advertisement preferences may be set by the user including demographic information (e.g., gender, age, etc.), socioeconomic information (e.g., annual household income, family status, educational background, etc.), or the like to control advertisement presentations. In the example illustrated in FIG. 4, an advertisement 402 is displayed based on the customer's advertising preferences and customer information.

Figure 5:
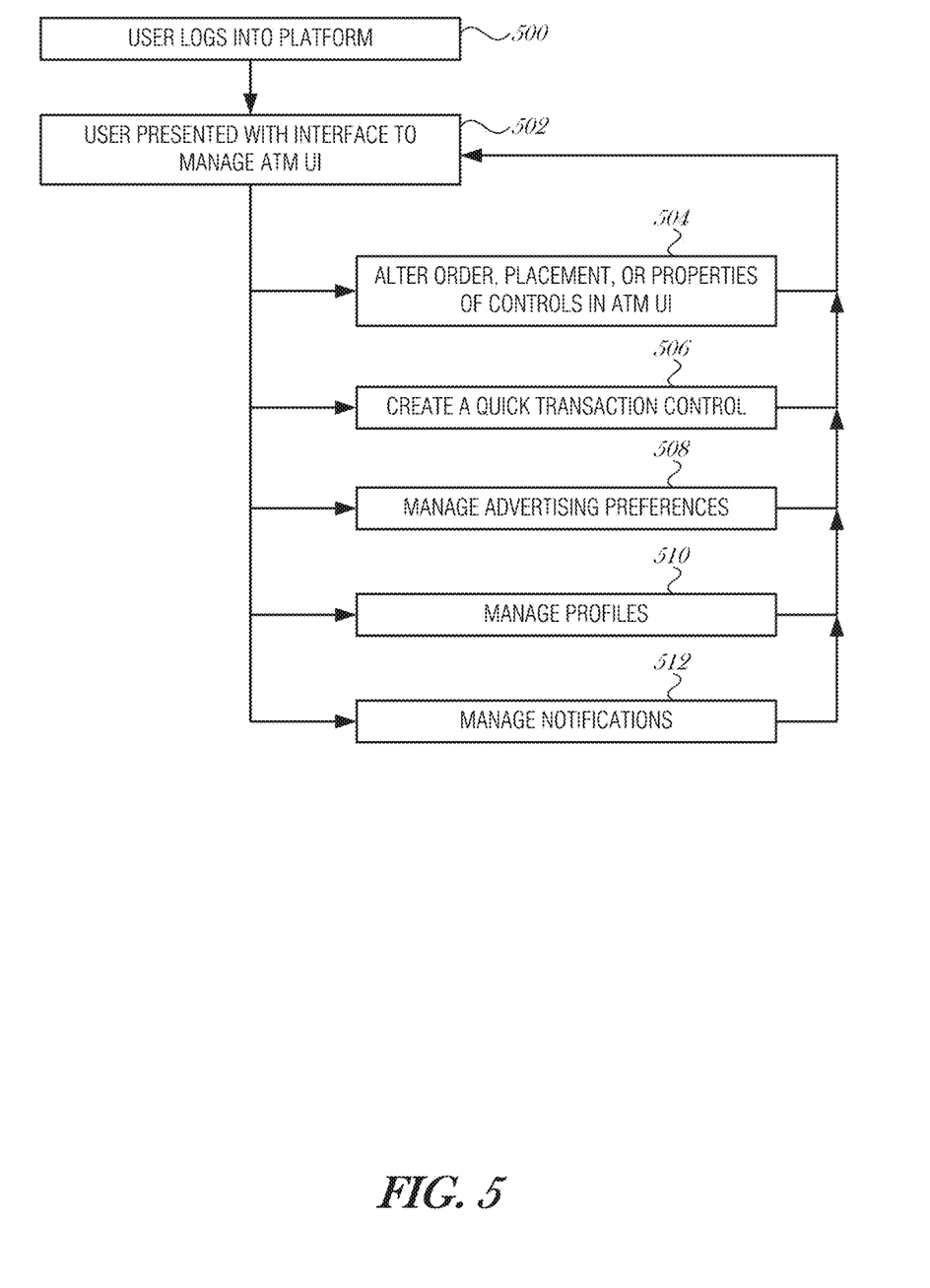
FIG. 5 is a flow diagram illustrating the control and data flow when modifying an ATM UI, according to an embodiment.

FIG. 5 is a flow diagram illustrating the control and data flow when modifying an ATM UI, according to an embodiment. At operation 500, a user logs on to a platform provided by a financial institution. Access to the platform may be by way of a webpage, a mobile app, a desktop application, a kiosk, or the like. After authentication (e.g., with a username and password), the user may be presented with an interface to perform various functions (operation 502). The user may choose to manage the user interface presented at an ATM, choose to create a pre-staged transaction, or choose to simulate a transaction.

When the user chooses to manage the user interface presented at an ATM, one or more interfaces may be presented to the user to manage various aspects of an ATM UI. The user may alter what operations are available or the order, placement, or properties of the commands in the UI (operation 504), create a quick transaction control (operation 506), manage advertising preferences (operation 508), manage the user's profile or profiles of sub-accounts (e.g., child's account or spouse's account) (operation 510), or create and manage notifications (operation 512).

In operation 504, the user may be presented with a mockup of an ATM's UI, in which the user may move icon representing the controls displayed in the UI. For example, with reference to FIG. 2, a user may use an input device (e.g., a mouse or a finger on a touchscreen display) to click and drag a control, such as the deposit control 202 from the first line of controls to a different position. Other controls may automatically shift or move to adjust their position in response to the user's placement of the deposit control 202. As another example, the user may perform an input command to hide or show a control. The user may right-click on a control and change the properties, such as a hide/show flag, a transparency setting, a background or foreground color, a text color/font/shape/size, the language displayed in the control, and other aspects of the control.

The properties may be configurable based on the type of control being manipulated. For example, a deposit control 202 may have properties such as the account or accounts to deposit to, whether to print or transmit a receipt, time frames when the control is active, and the like. As another example, a withdrawal control (e.g., control 200 from FIG. 2), may have properties such as the withdrawal amount, an account or accounts to withdraw from, whether to print or transmit a receipt, time frames when the control is active, and the like. The user may set times when a control is available in the ATM UI. For example, the user may disable the withdraw control 200 after 10:00 PM and before 7:00 AM daily. Such control over the availability of the withdrawal control provides additional security in the case that the ATM card is lost or stolen. Other controls may be enabled or disabled based on time, place, or context of the ATM or transactions at the ATM.

In operation 506, the user may create and manage a quick transaction control. The quick transaction control may execute one or more transactions. In sense, the quick transaction control may be used as a kind of macro for bundling one more user interface controls together under one control. A user may, for example, have several children, each with their own savings account. Using a quick transaction, the user may configure a UI control to be displayed on an ATM UI to distribute $30 to each of the children's accounts from a source account (e.g., the user's checking account). The user may place the control in a screen that is accessible from a "More Choices" control (e.g., item 206 in FIG. 2). When the user deposits her paycheck at the ATM, the user may easily access the quick transaction and distribute an allowance to each of her children's accounts.

Some quick transactions may be automatically configured by a backend system. For example, the withdrawal control 200 in FIG. 2 may be dynamically configured based on a withdrawal history of the user or of multiple users (e.g., based on an analysis of all North American users or on users in her region, etc.). In operation 506, the user may alter or modify the dynamically configured quick transaction control. For example, the user may opt out (or opt in) to dynamic configuration of the control. As another example, the user may add thresholds (e.g., do not set control to withdraw more than $20), or set other parameters or properties of the control. As yet another example, the user may duplicate a dynamically managed control and manage the duplicate, so that multiple controls of the same type appear, but with each having separate operating parameters.

In operation 508, the user may manage advertising preferences. Advertisements may be served at the ATM. The user may opt in or opt out of advertising, change demographic or socioeconomic data to alter targeted advertisements, control which channels are used for which advertisements, or control what types of advertisements are used (e.g., video advertisements or text advertisement, interactive advertisements, etc.). Advertisements for charities, political organizations, fundraisers, and other types of contributions may be controlled with the advertising preferences. Third parties may want to advertise via a financial institution's ATM and the user may control whether third parties have access to user information, financial information, or the like, and whether such advertisements are presented at all. Advertisements may be controlled so that only certain types or kinds of advertisements are shown (e.g., only see loan offers, but not investment offers), or that only certain types or kinds of advertisements are shown at certain locations or in certain channels (e.g., only see loan offers when at an ATM at a branch office, but not at the airport ATMs).

In operation 510, the user may manage profiles of the user's account or any sub-accounts. Managing profiles may include various aspects, such as managing usernames and passwords, PINs, names, addresses, and the like. Profile information may also include UI preferences, such as a display theme for a UI. Themes may be based on visual themes, seasons, sports teams, activities, interests, or the like. The user may set up a UI theme based on her son's favorite sports team. The ATM may then take on a certain color scheme, iconic elements, or other aspects to modify the ATM UI to look similar to or reminder the user (e.g., the son) of the sports team.

In operation 512, the user may manage notifications. Various notifications may be presented at the ATM. For example, a reminder of a person's birthday may be presented, which may remind the user to withdraw additional money to insert into a birthday card. Other reminders may be used, such as holidays, shopping lists, and the like. Notifications may be user-defined so that the user creates the notification in the non-ATM channel (e.g., in operation 512), and the notification later is displayed at the ATM. Notifications may also be system-generated, such as a notification of a low balance in an account. The user may manage when and how notifications are displayed in operation 512.

After modifying the ATM UI, the user may want to test the transactional flow. In an embodiment, the user is provided an ATM simulator, which simulates the user interfaces presented during a simulated transaction. The ATM simulator may present the user with an ATM screen that reacts to user input the same was an ATM in the field would react. Additional input mechanisms may be provided in the simulator to recreate multi-touch input, gesture input, voice commands, and the like. Actions in the simulator may be saved in the sequence performed, thereby creating a script of user actions. The script may be saved to a custom button or other user interface element on a user's mobile device (e.g., smartphone, tablet, etc.), so that when the user next interacts with an ATM, the user may trigger the script and have the actions performed at the ATM as if the user performed them.

Figure 6:
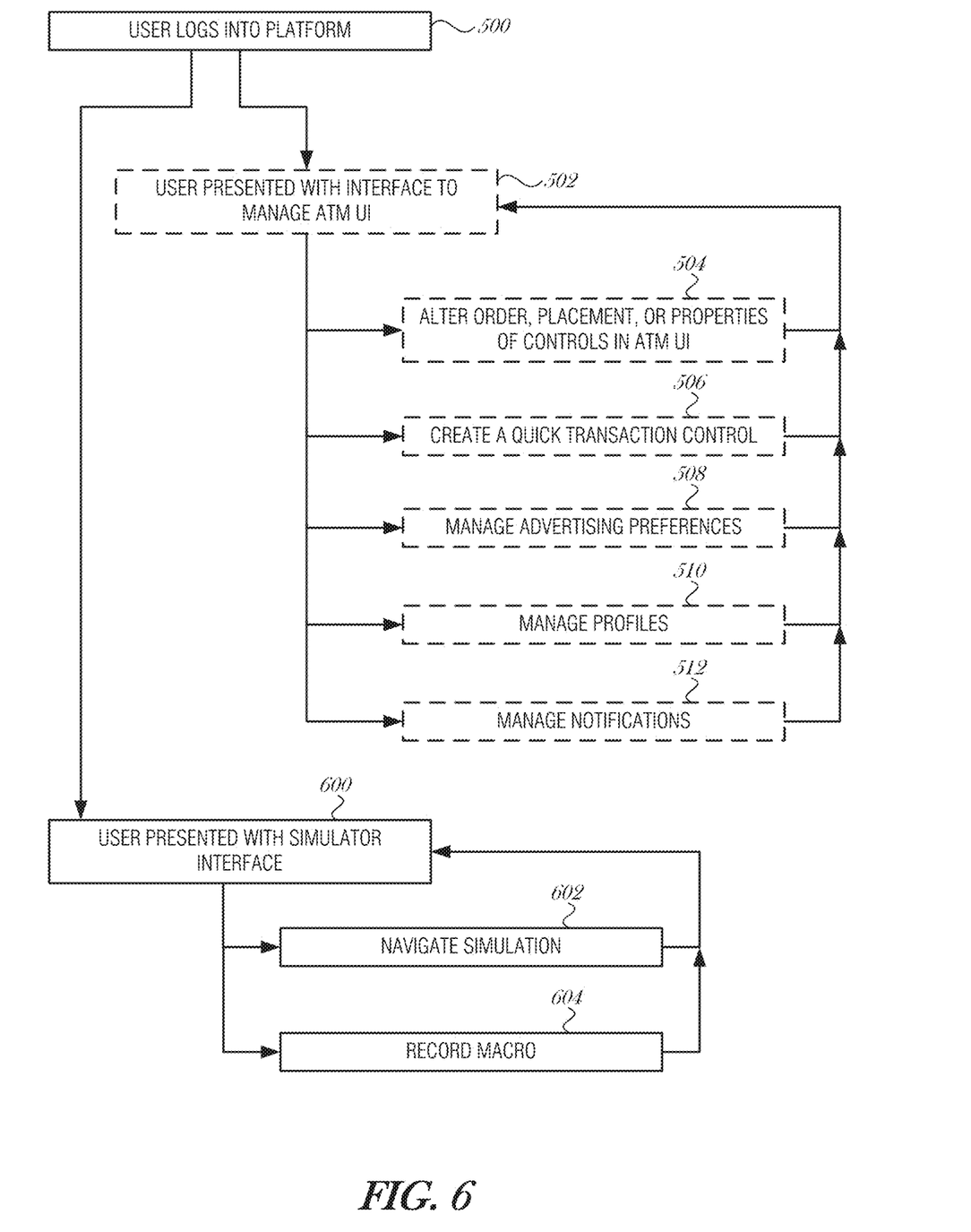
FIG. 6 is a flow diagram illustrating the control and data flow of simulation-created scripts, according to an embodiment.

FIG. 6 is a flow diagram illustrating the control and data flow of simulation-created scripts, according to an embodiment. At operation 600, the user accesses an ATM simulator. In the simulator, the user may perform operations as if the ATM were responding to their actions. The simulator may access the user's financial accounts to present actual financial and account information (e.g., balances, transaction history, sub-accounts, etc.) or the simulator may use fabricated data for the simulation.

While in the simulator, the user may navigate through the simulation (operation 602) or record a macro of ATM UI interactions (operation 604). When navigating the simulation (operation 602), the user may interact with the ATM as if actually being at the ATM. The user may set contextual preferences, such as the time, date, or location of the ATM to better simulate the ATM's operation. In this manner, the user may test various aspects of the ATM's operation (e.g., advertising preferences, quick transaction controls, hide/show or placement of controls, etc.) that the user set in the ATM UI management operations discussed above with respect to FIG. 5. The user may traverse between the ATM UI management operations and the simulator to set and test various aspects.

In operation 604, the user may record a macro (e.g., script) and save the macro to a UI control. The user may then manage the macro UI control using the various ATM UI management operations described above. The user may create a macro of several screen touches or other user interface interactions at home, save the macro to a control, place the control on the first screen displayed, and then when at the ATM, actuate the control to perform the saved screen touches or other user interface interactions. Such functionality may be useful for those who are disabled, elderly, or otherwise looking to expedite the experience at the ATM. Macro controls may be single-use, in that after one use, the macro may no longer be displayed or available. As with other controls, the macro control may be active during certain times, dates, or other time periods. When not active, the macro control may be hidden or shown but disabled. Several macros may be created and presented on the ATM UI. After a macro is recorded and saved, the user may interact with the ATM simulator (operation 602) to test the macro.

As an extension to modifying the layout or adding customized buttons, the user may create pre-staged transactions. The pre-staged transactions may be similar to the simulator-based scripts in that they may include a number of automated actions that are preconfigured to execute when the user is at an ATM. Pre-staged transactions may be saved for use at one or more ATMs repeatedly. The pre-staged transaction may be set up at home using a non-ATM channel and then executed at the ATM. Some of the pre-staged transaction may be performed away from the ATM and then the concluding actions may be performed at the ATM.

An example pre-staged transaction includes a deposit of a check into several accounts. The customer may have a check to deposit and want the proceeds of the check to be deposited into a checking and savings account. The customer may set up the deposit at home by logging into an online banking account, using the UI customization tool to create a pre-staged transaction, and providing the transaction flow. The customer may indicate the amount of the deposit and the amount of proceeds to be deposited in each of a checking and savings account, for example. After saving the pre-staged transaction, the customer may stop by an ATM later, provide their bankcard and PIN to access their home screen, and select the icon or other user interface control to activate the pre-staged transaction. The customer then only needs to deposit the check into the bill acceptor and the ATM may then scan the check the verify the contents and process the check deposit according to the parameters provided (e.g., deposit some into savings and some into checking).

Multiple pre-staged transactions may be bundled together. For example, the customer may create one pre-staged transaction for the deposit of several checks, where for each check a certain amount is indicated to be deposited into particular accounts. When the customer is at the ATM, the customer may activate the one pre-staged transaction user interface element to trigger the pre-staged transaction, then feed several checks, notes, bills, or the like into the bill acceptor, and based on the one or more transactions set up in the pre-staged transaction, each deposit may be handled separately.

Figure 7:
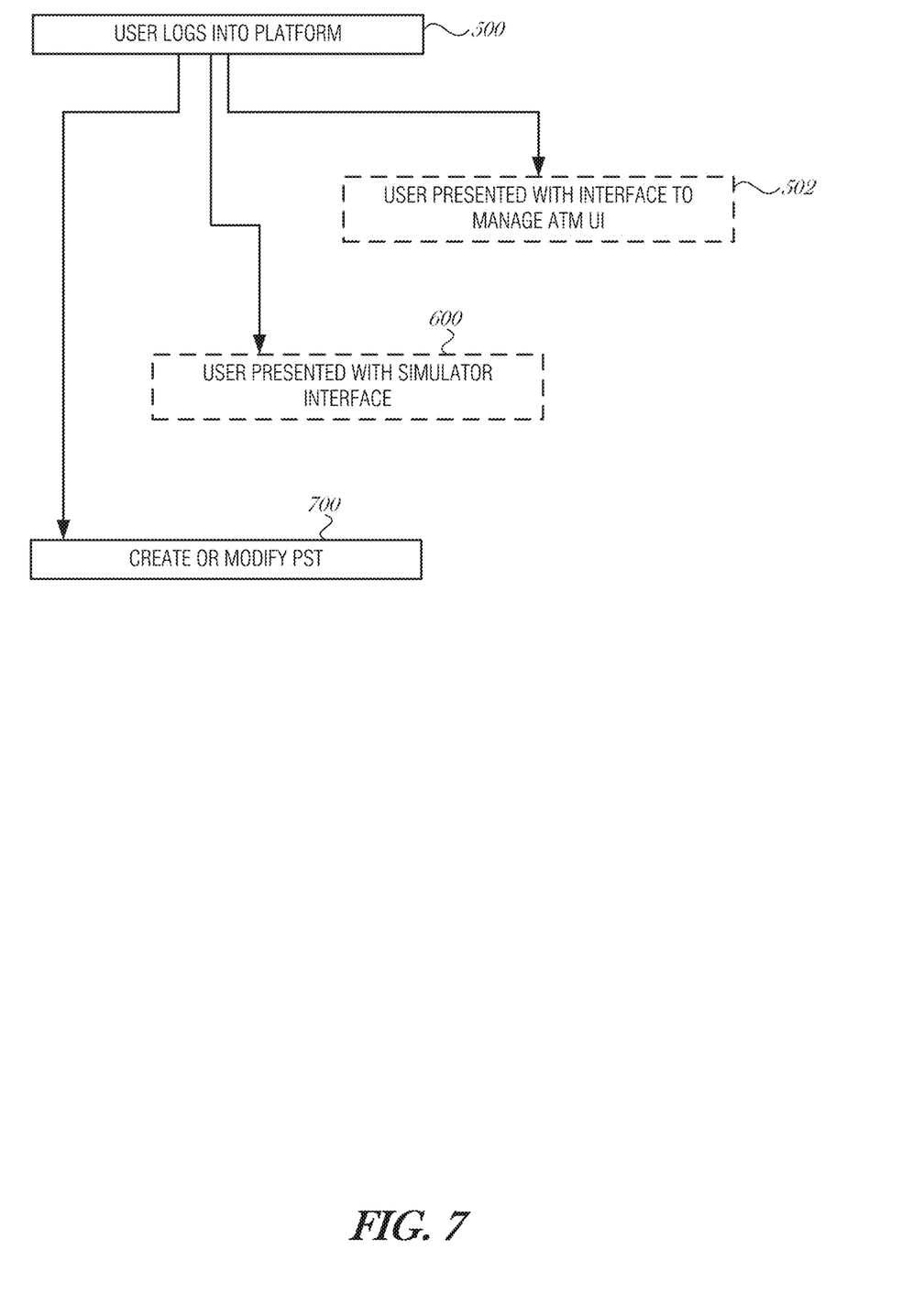
FIG. 7 is a flow diagram illustrating the control and data flow of creating and managing pre-staged transactions, according to an embodiment.

FIG. 7 is a flow diagram illustrating the control and data flow of creating and managing pre-staged transactions, according to an embodiment. The user may be presented with an interface to manage pre-staged transactions (PST). In operation 700, the user may select to create a new PST or modify an existing PST. Creation of a PST may involve operations such as naming the PST, assigning the PST a type or classification, adding an icon to the control to activate the PST at the ATM, assigning times or dates when the PST is active, and the like. In addition, creating the PST includes defining one or more operations or parameters of the transaction using the non-ATM channel and then integrating that with the concluding portion of the transaction executed at the ATM, The user may modify and use existing PSTs in a similar manner.

In an example, Joe receives several checks from his friends and family as birthday gifts. Joe may create a PST to deposit the checks into multiple accounts. Joe may create the PST by selecting a type of PST (e.g., deposit transaction), indicating each check number, the check amount, and to which account the check is to be deposited. After Joe enters the checks' information, Joe may save the PST with an icon depicting a deposit and place the icon in the ATM interface. Joe may use operations as described above or the ATM interface modifications may be performed while Joe is creating the PST. Once at the ATM, Joe may choose the PST (there may be more than one PST presented), and complete the transaction in a quicker manner.

Figure 8:
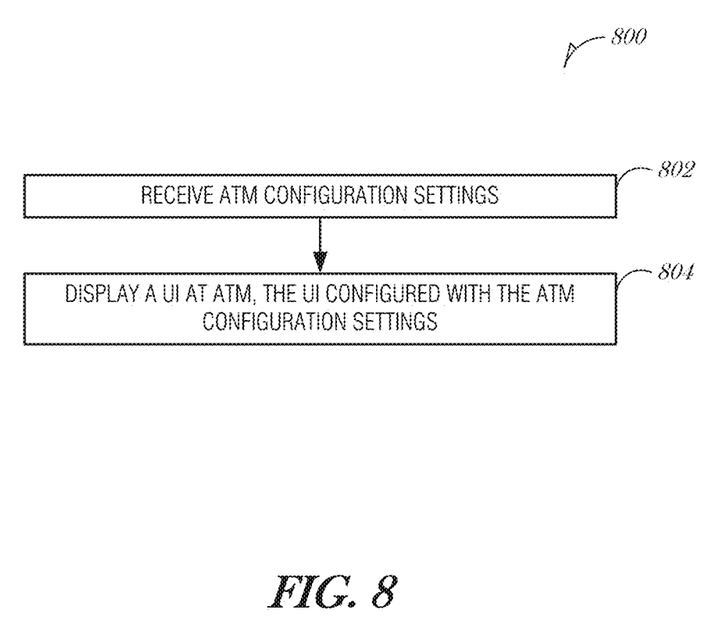
FIG. 8 is a flowchart illustrating a method of personalizing an ATM UI, according to an embodiment.

FIG. 8 is a flowchart illustrating a method 800 of personalizing an ATM UI, according to an embodiment. At block 802, an ATM configuration setting from a non-ATM channel is received at an ATM, the ATM configuration setting set by a user of the ATM. The non-ATM channel may be a home desktop computer, a mobile phone, or other device not directly associated with an ATM or ATM system.

At block 804, a user interface is displayed at the ATM, the user interface configured with the ATM configuration setting.

In an embodiment, the non-ATM channel comprises a personal computing device. The personal computing device may be any type of device, such as a laptop, a desktop, an in-vehicle infotainment system, or the like. In an embodiment, the non-ATM channel comprises a smartphone. Other mobile devices are included in the scope of this discussion.

In an embodiment, the ATM configuration setting comprises a display property of a user interface command of the ATM user interface. In a further embodiment, the display property comprises at least one of an ordering, a placement, a size, a shape, a color, or a font of the user interface command. The display properties may be used by the ATM to format the UI of the ATM.

In an embodiment, the ATM configuration setting comprises a hide/show toggle setting. One or more controls may be hidden or shown based on various factors, such as the location of the ATM, the time of day, or the like.

In an embodiment, the ATM configuration setting comprises a quick transaction, the quick transaction comprises settings used for a transaction at the ATM initiated by a single button displayed at the ATM.

In an embodiment, the ATM configuration setting comprises an advertising preferences setting. In such an embodiment, the ATM may selectively display advertisements based on the advertising preferences. Advertising preferences include such things as which types of advertisements may be shown, when advertisements may be shown, and for which products or types of products advertisements may be shown.

In an embodiment, the ATM configuration setting comprises a macro, the macro including a plurality of user interface operations executed in response to a user interface command being actuated at the ATM. User interface operations include such operations as clicking on a control, scrolling through a menu, switching screens, providing a numerical value (e.g., entering a dollar amount into a field), or the like.

In an embodiment, the ATM configuration setting comprises a pre-staged transaction, the pre-staged transaction including a portion of a transaction. In such an embodiment, to display the user interface at the ATM, a user interface command is displayed, which may be used to initiate the pre-staged transaction and the user is then able to complete the pre-staged transaction at the ATM.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 9:
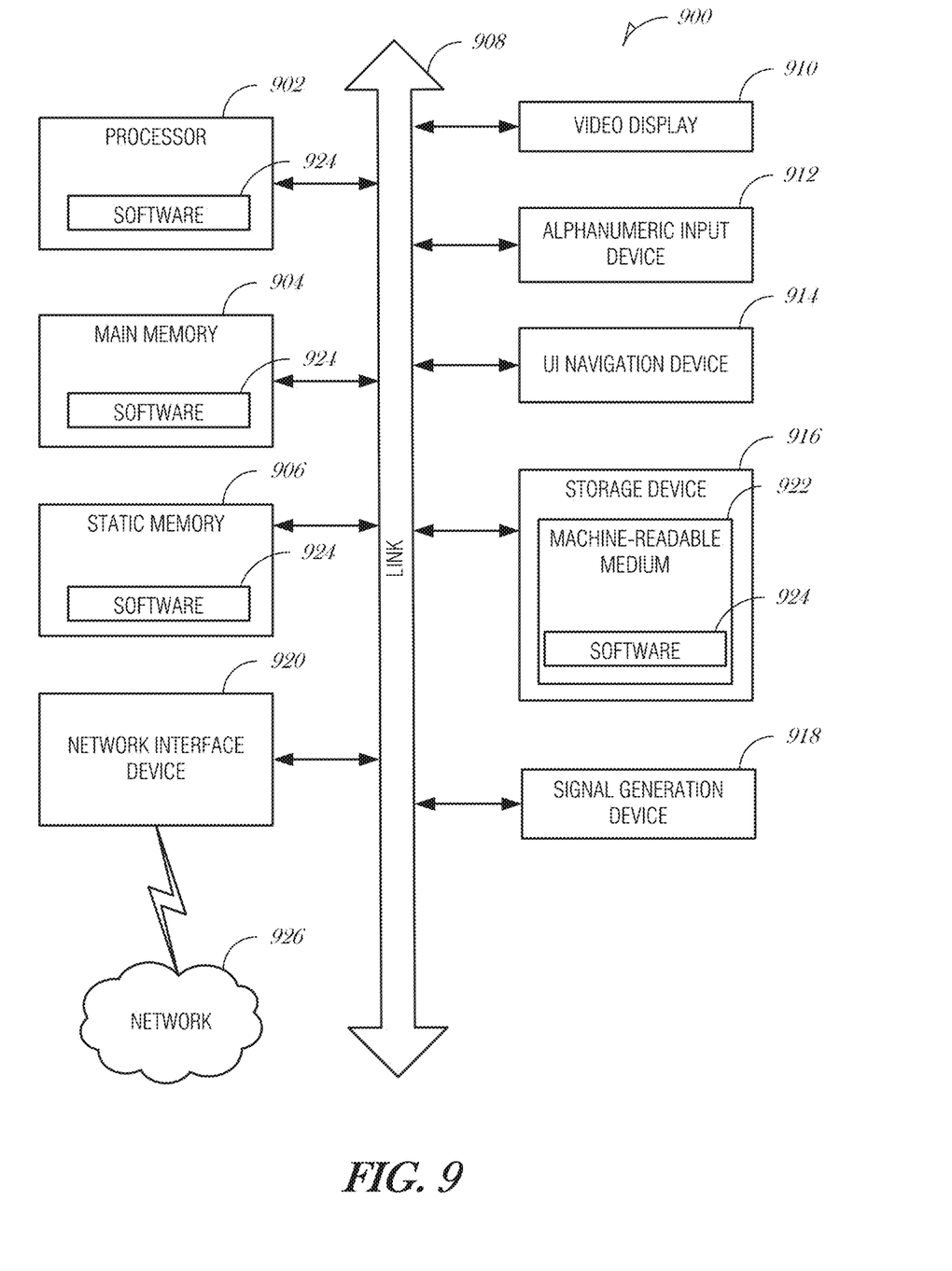
FIG. 9 is a block diagram illustrating an example machine upon which any one or more of the techniques (e.g., methodologies) discussed herein may perform, according to an example embodiment.

FIG. 9 is a block diagram illustrating a machine in the example form of a computer system 900, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, set-top box, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the tei in "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 900 includes at least one processor 902 (e.g., a central processing unit (CPU), a graphics processing unit (GPU) or both, processor cores, compute nodes, etc.), a main memory 904 and a static memory 906, which communicate with each other via a link 908 (e.g., bus). The computer system 900 may further include a video display unit 910, an alphanumeric input device 912 (e.g., a keyboard), and a user interface (UI) navigation device 914 (e.g., a mouse). In one embodiment, the video display unit 910, input device 912 and UI navigation device 914 are incorporated into a touch screen display. The computer system 900 may additionally include a storage device 916 (e.g., a drive unit), a signal generation device 918 (e.g., a speaker), a network interface device 920, and one or more sensors (not shown), such as a global positioning system (GPS) sensor, compass, accelerometer, or other sensor.

The storage device 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904, static memory 906, and/or within the processor 902 during execution thereof by the computer system 900, with the main memory 904, static memory 906, and the processor 902 also constituting machine-readable media.

While the machine-readable medium 922 is illustrated in an example embodiment to be a single medium, the term "machine-readable medium" may include a single medium or multiple media (e.g., a centralized or distributed database, and/or associated caches and servers) that store the one or more instructions 924. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies; the usage in this document controls.

In this document, the terms "a" or "an" are used, as is common in patent documents, to include one or more than one, independent of any other instances or usages of "at least one" or "one or more." in this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for personalizing an automated teller machine user interface, the system comprising:
 a display;
 a processor subsystem; and
 a memory including instructions, which when executed by the processor subsystem, cause the processor subsystem to:
  receive, at an ATM, an ATM configuration setting from a non-ATM channel, the ATM configuration setting set by a user of the ATM, and the ATM configuration setting comprising multiple pre-staged transactions bundled together; and
  display a user interface on the display, the user interface configured with the ATM configuration setting, and the user interface to display a user interface command to initiate the multiple pre-staged transactions, where the user is then able to complete the multiple pre-staged transactions at the ATM,
  wherein the multiple pre-staged transactions include a first pre-staged deposit transaction to a first account and a second pre-staged deposit transaction to a second account, each of the first and second pre-staged deposit transactions selectively performed in response to a first article received in a bill acceptor of the ATM to perform the first pre-staged deposit transaction and in response to a second article received in the bill acceptor to perform the second pre-staged deposit transaction.

2. The system of claim 1, wherein the non-ATM channel comprises a personal computing device.

3. The system of claim 1, wherein the non-ATM channel comprises a smartphone.

4. The system of claim 1, wherein the ATM configuration setting comprises a display property of the user interface command of the ATM user interface.

5. The system of claim 4, wherein the display property comprises at least one of an ordering, a placement, a size, a shape, a color, or a font of the user interface command.

6. The system of claim 1, wherein the ATM configuration setting comprises a hide/show toggle setting.

7. The system of claim 1, wherein the ATM configuration setting comprises a quick transaction, the quick transaction comprises settings used for a transaction at the ATM initiated by a single button displayed at the ATM.

8. The system of claim 1, wherein the ATM configuration setting comprises an advertising preferences setting, and wherein the instructions to display the user interface on the display comprise instructions to selectively display advertisements based on the advertising preferences.

9. The system of claim 1, wherein the ATM configuration setting comprises a macro, the macro including a plurality of user interface operations executed in response to a second user interface command being actuated at the ATM.

10. A method of personalizing an automated teller machine (ATM) user interface, the method comprising:
receiving, at an ATM, an ATM configuration setting from a non-ATM channel, the ATM configuration setting set by a user of the ATM, and the ATM configuration setting comprising multiple pre-staged transactions bundled together; and
displaying a user interface at the ATM, the user interface configured with the ATM configuration setting, and the user interface to display a user interface command to initiate the multiple pre-staged transactions, where the user is then able to complete the multiple pre-staged transactions at the ATM,
wherein the multiple pre-staged transactions include a first pre-staged deposit transaction to a first account and a second pre-staged deposit transaction to a second account, each of the first and second pre-staged deposit transactions selectively performed in response to a first article received in a bill acceptor of the ATM to perform the first pre-staged deposit transaction and in response to a second article received in the bill acceptor to perform the second pre-staged deposit transaction.

11. The method of claim 10, wherein the non-ATM channel comprises a personal computing device.

12. The method of claim 10, wherein the non-ATM channel comprises a smartphone.

13. The method of claim 10, wherein the ATM configuration setting comprises a display property of the user interface command of the ATM user interface.

14. The method of claim 13, wherein the display property comprises at least one of an ordering, a placement, a size, a shape, a color, or a font of the user interface command.

15. The method of claim 10, wherein the ATM configuration setting comprises a hide/show toggle setting.

16. The method of claim 10, wherein the ATM configuration setting comprises a quick transaction, the quick transaction comprises settings used for a transaction at the ATM initiated by a single button displayed at the ATM.

17. The method of claim 10, wherein the ATM configuration setting comprises an advertising preferences setting, and wherein displaying the user interface at the ATM comprises selectively displaying advertisements based on the advertising preferences.

18. The method of claim 10, wherein the ATM configuration setting comprises a macro, the macro including a plurality of user interface operations executed in response to a second user interface command being actuated at the ATM.

19. A non-transitory machine-readable medium comprising instructions, which when executed by an automated teller machine (ATM), cause the ATM to:
receive an ATM configuration setting from a non-ATM channel, the ATM configuration setting set by a user of the ATM, and the ATM configuration setting comprising multiple pre-staged transactions bundled together; and
display a user interface at the ATM, the user interface configured with the ATM configuration setting, and the user interface to display a user interface command to initiate the multiple pre-staged transactions, where the user is then able to complete the multiple pre-staged transactions at the ATM,
wherein the multiple pre-staged transactions include a first pre-staged deposit transaction to a first account and a second pre-staged deposit transaction to a second account, each of the first and second pre-staged deposit transactions selectively performed in response to a first article received in a bill acceptor of the ATM to perform the first pre-staged deposit transaction and in response to a second article received in the bill acceptor to perform the second pre-staged deposit transaction.

20. The non-transitory machine-readable medium of claim 19, wherein the non-ATM channel comprises a personal computing device.

* * * * *